(12) United States Patent
Wang et al.

(10) Patent No.: US 12,496,651 B2
(45) Date of Patent: Dec. 16, 2025

(54) METHOD FOR DETERMINING MAGNETIC FIELD PARAMETER THRESHOLD OF NEGATIVE-PRESSURE ARC WELDING

(71) Applicant: Shanghai University of Engineering Science, Shanghai (CN)

(72) Inventors: Ying Wang, Shanghai (CN); Jian Luo, Shanghai (CN); Riping Cheng, Shanghai (CN); Kanghui Zheng, Shanghai (CN); Kefeng Xu, Shanghai (CN)

(73) Assignee: Shanghai University of Engineering Science, Shanghai (CN)

( * ) Notice: Subject to any disclaimer, the term of this patent is extended or adjusted under 35 U.S.C. 154(b) by 0 days.

(21) Appl. No.: 19/031,282

(22) Filed: Jan. 17, 2025

(65) Prior Publication Data
US 2025/0276397 A1  Sep. 4, 2025

(30) Foreign Application Priority Data

Mar. 3, 2024 (CN) .......................... 202410238313.4

(51) Int. Cl.
*B23K 9/095* (2006.01)
(52) U.S. Cl.
CPC .................................. *B23K 9/0953* (2013.01)
(58) Field of Classification Search
CPC . B23K 9/04; B23K 9/08; B23K 9/167; B23K 9/32; B23K 9/0953
See application file for complete search history.

(56) References Cited

U.S. PATENT DOCUMENTS

2016/0067811 A1* 3/2016 Jiang ..................... B23K 9/073
219/145.21

FOREIGN PATENT DOCUMENTS

| CN | 114713942 A | 7/2022 |
|---|---|---|
| CN | 2023103233 A1 | 6/2023 |

* cited by examiner

*Primary Examiner* — Brian W Jennison
(74) *Attorney, Agent, or Firm* — Frank Niranjan

(57) ABSTRACT

The present disclosure provides a method for determining a magnetic field parameter threshold of negative-pressure arc (NPA) welding including the following steps: forming a control equation using the Navier-Stokes equation, heat transfer equation, and Maxwell's electromagnetic equation; establishing a geometric model and meshing; setting material parameters; setting initial conditions and boundary conditions; conducting parameterized scanning, setting solver, collecting NPA data, and fitting NPA function; afterwards, performing numerical simulation calculation of NPA under different conditions, and then fitting the calculated NPA threshold data, such that the equation for determining the magnetic field parameter threshold of NPA welding can be obtained. The method may more accurately predict the threshold condition of NPA welding and provide guidance for NPA welding technology; and solving the instability of the molten pool caused by gravity and arc positive pressure during conventional positive pressure arc thin-wall surfacing, additive manufacturing, and inclined welding process.

5 Claims, 5 Drawing Sheets

METHOD FOR DETERMINING MAGNETIC FIELD PARAMETER THRESHOLD OF NEGATIVE-PRESSURE ARC WELDING

CROSS-REFERENCE TO RELATED APPLICATION

This patent application claims the benefit and priority of Chinese Patent Application No. 202410238313.4 filed with the China National Intellectual Property Administration on Mar. 3, 2024, the disclosure of which is incorporated by reference herein in its entirety as part of the present application

TECHNICAL FIELD

The present disclosure relates to the field of arc welding, in particular to a method for determining a magnetic field parameter threshold of negative-pressure arc welding.

BACKGROUND

Gas tungsten electrode arc welding (GTAW) is a common technology in the welding field and is mainly used for welding thin-walled and non-ferrous metals, with good weld formation and less spatter. However, excavation of the weld pool by the normal GTAW welding arc positive pressure leads to instability of the weld pool and produces welding defects. In thin-wall surfacing and oblique welding, the welding pool flows to the sidewall under the action of gravity, arc blowing force, and surface tension, which reduces the accuracy and performance of the welded workpiece. Although the sidewall flow phenomenon of the welding pool can be improved by physical constraints, the physical constraint occupies a large number of welding workpieces and has poor flexibility in dealing with different welding situations, which cannot meet the welding and forming of complex components. At the same time, excessive arc pressure also produces spatter during welding, which reduces the welding quality.

By forming an arc negative-pressure on the surface of the welding pool opposite to gravity, the pool can be attracted upward, and the flow behavior of the pool can be changed. The use of a negative arc pressure can improve the molten pool flow and welding defects in the welding process, thus improving the welding quality and efficiency, which has important research significance.

At present, the main means of forming a negative-pressure arc is an external longitudinal magnetic field. However, owing to the different currents or other conditions during arc welding, the threshold of the magnetic field transition from positive pressure to negative-pressure is different. At present, many creative experiments are required to determine this, which consumes a lot of energy, time, manpower, and capital costs. The uncertainty of this magnetic field parameter threshold is a major problem to be solved in the deep research and technology of negative-pressure arc welding.

In view of this, the present disclosure proposes a method for determining the threshold of magnetic field parameters in negative-pressure arc welding to solve the above problems.

SUMMARY

To solve the above problems, an objective of the embodiments of the present disclosure is to provide a method for determining a magnetic field parameter threshold of negative-pressure arc welding and further quantitatively determine the magnetic field parameter threshold under different conditions by using a numerical simulation method.

To achieve the above technical objectives, the present disclosure provides a method for determining a magnetic field parameter threshold of negative-pressure arc welding, which includes the following steps: first, establishing a mathematical model of a negative-pressure arc, calculating the negative-pressure threshold under different conditions, and then fitting the calculated negative-pressure threshold to obtain an equation for determining the magnetic field parameter threshold of negative-pressure arc welding, the method specifically including:

Step 1: establishing a control equation, which consists of a Navier-Stokes equation, a heat transfer equation, and a Maxwell's electromagnetic equation, specifically comprising:

determining velocity and pressure distribution of arc plasma based on mass conservation and momentum conservation equations $$\frac{\partial \rho}{\partial t} + \nabla \cdot (\rho v) = 0 \tag{1}$$

$$\rho \frac{\partial v}{\partial t} + \rho(v \cdot \nabla)v = \nabla \cdot \left[-pI + \mu(\nabla v + (\nabla v)^T) - \frac{2}{3}\mu(\nabla \cdot v)I\right] + F \tag{2}$$

where $\rho$ is density, V is velocity vector, P is pressure, $\mu$ is viscosity, I is identity matrix, and F is momentum source;

solving arc temperature T according to energy conservation equation $$\rho C_p \left(\frac{\partial T}{\partial t} + v \cdot \nabla T\right) = \nabla \cdot (k \nabla T) + Q \tag{3}$$

where k is coefficient of heat conduction, T is temperature, $C_p$ is specific heat capacity, and Q is a source term of the energy conservation equation;

calculating potential and magnetic vector potential distribution according to current continuity equation and Ohm's law $$\nabla \cdot \left(\sigma \nabla V + \sigma \frac{\partial A}{\partial t}\right) = 0 \tag{4}$$

$$\nabla \times \left(\frac{1}{\mu_0} \nabla \times A\right) + \sigma \nabla V = 0 \tag{5}$$

where V is potential, A is magnetic vector potential, and $\sigma$ is conductivity;

solving current density J and magnetic flux density B of electric field E based on V and A according to equations:

$$J = -\sigma\left(\nabla V + \frac{\partial A}{\partial t}\right) \tag{6}$$

$$E = -\left(\nabla V + \frac{\partial A}{\partial t}\right) \tag{7}$$

$$B = \nabla \times A \tag{8}$$

where J is current density, E is electric field, and B is magnetic flux density;

solving the arc energy source term consisting of Joule heat, electron enthalpy transfer, and arc radiation loss according to:

$$Q = J \cdot E + \frac{\partial}{\partial T}\left(\frac{5k_b T}{2q}\right)(\nabla T \cdot J) - Q_{rad} \quad (9)$$

where $K_B$ is Boltzmann constant; e is electron charge; T is temperature field of arc shape; Q is heat source term; Qrad is arc radiation loss;

solving a momentum source term in the momentum conservation equation based on the arc self-induced magnetic flux density B, the current density J, and the momentum conservation equation according to:

$$F = J \times B \quad (10)$$

Step 2: establishing geometric models and meshing: establishing geometric models of a hollow tungsten electrode arc and a solid tungsten electrode arc and then selectively meshing the models.

Step 3: setting material parameters: selectively setting material parameters for each part of the geometric models.

Step 4: setting initial conditions and boundary conditions comprising boundary heat flux, cathode boundary, anode boundary, pressure, current density and potential, and loading volume force $J*(B+B_0)$; where the boundary conditions include:

(1) solid current-density input given by $$J = \frac{1}{\pi R_w^2} \quad (11)$$

(2) current density of hollow tungsten electrode given by:

$$J = \frac{1}{R_w^2 - R_i^2} \quad (12)$$

(3) shielding gas flow rate given by:

$$v_{in}(r) = \frac{2Q}{\pi} \frac{R_n^2 - r^2 + (R_n^2 - R_w^2)\left(\ln\left(\frac{r}{R_n}\right)/\ln\left(\frac{R_n}{R_w}\right)\right)}{R_n^4 - R_w^4 + \left((R_n^2 - R_w^2)^2/\ln\left(\frac{R_n}{R_w}\right)\right)} \quad (13)$$

where I is welding current, Q is shielding gas flow, $R_n$ is shielding gas inlet radius, $R_w$ is tungsten electrode radius, $R_i$ is inner diameter of hollow cavity, and r is distance from shielding gas inlet to the center;

(4) the cathode boundary defined by:

$$-n \cdot (-k\nabla T) = |J_i|V_i - |J_e|\phi_e - \alpha\varepsilon T^4 \quad (14)$$

$$J_e = J_r[(|J \cdot n| - J_r) > 0] + |J \cdot n|[(|J \cdot n| - J_r) < 0] \quad (15)$$

$$J_i = |J \cdot n| - J_e \quad (16)$$

$$J_r = A_r T^2 \exp\left(\frac{-\phi_e}{k_b T}\right) \quad (17)$$

(5) the anode boundary defined by:

$$-n \cdot (-k\nabla T) = |J \cdot n|\phi_a - \alpha\varepsilon T^4 \quad (18)$$

where $|J_i|V_i$ is cathode ion heat, $|J_e|\phi_c$ is electron heat that plays a cooling role; and $\phi_a$, $\phi_c$ is surface work function; $V_i$ is ionization potential of argon; $A_r$ is Richardson constant, $\phi_e$ is effective work function of cathode, e is elementary charge and $k_b$ is Boltzmann constant; and where (6) an external electromagnetic force is added by changing the momentum source term according to:

$$F = J \times (B + B_0) \quad (19)$$

where $B_0$ denotes magnetic flux density of an external longitudinal magnetic field;

Step 5, performing parameterized scanning, and setting a solver: performing calculation and solving according to the above steps and verifying whether the calculated results are consistent with experimental results under same conditions; when the calculated results are consistent with the experimental results, proceeding to the next step; otherwise, returning to step 2, adjusting the model or the boundary conditions, and repeating a cycle process of modeling and numerical simulation calculation until the calculated results are consistent with the experimental results under the same conditions so that a model accuracy verification is achieved.

Step 6: fixing the model and solving method, parameterizing a batch calculation to obtain the parameter threshold of negative-pressure welding under other conditions, processing the parameter threshold of negative-pressure welding, and determining a threshold function of negative-pressure welding: fitting multiple groups of threshold data of negative-pressure welding under different conditions to obtain a functional equation of a threshold of longitudinal magnetic field parameters of negative-pressure arc welding.

In some embodiments, in step 2, suction pressure is applied to the hollow tungsten electrode arc to study physical characteristics of the suction pressure on the hollow tungsten electrode arc.

In some embodiments, mesh element in the meshing in Step 2 is a tetrahedron or a hexahedron.

In some embodiments, shielding gas in step 4 is selected from the group consisting of 99.99% argon, helium, and mixed inert gas, an external magnetic field mode is the longitudinal magnetic field mode, and a magnetic field mode is selected from the group consisting of a uniform alternating magnetic field mode, an intermittent alternating magnetic field mode, and a pulse alternating magnetic field mode.

In some embodiments, for a welding current of 80-200 A, arc length of 3 mm, 100% pure argon protection, and solid tungsten electrode conditions, a welding current-magnetic field strength as a function of the welding threshold constructed to be a negative-pressure GTAW weld is given by B(I)=0.0225+2.56e−5*exp(I/29.9).

In some embodiments, the method is for negative-pressure arc welding, negative-pressure arc additive manufacturing, negative-pressure arc-laser composite welding, negative-pressure arc-laser composite cladding, negative-pressure arc-laser composite additive manufacturing, negative-pressure arc-high energy beam composite welding, negative-pressure arc-high energy beam composite cladding, and negative-pressure arc-high energy beam composite additive manufacturing technologies.

Embodiments of the present disclosure have the following beneficial effects. The mathematical model of negative-pressure arc is established, the distribution of electric pressure under the external longitudinal magnetic field and suction pressure is analyzed, the negative-pressure threshold under different conditions is numerically simulated and calculated, and then the calculated negative-pressure threshold data is fitted, so that the equation for determining the magnetic field parameter threshold of negative-pressure arc welding can be obtained, which can more accurately predict the occurrence of negative-pressure and provide guidance for negative-pressure arc welding technology; solve the molten pool flowing behavior caused by gravity, arc pressure and plasma flow force during GTAW thin-wall surfacing and inclined welding.

The embodiments, functional characteristics, and advantages of the present disclosure will be further described with reference to the accompanying drawings in combination with examples.

DETAILED DESCRIPTION OF THE EMBODIMENTS

The embodiments of the present disclosure will be described in further detail in reference to the accompanying drawings and examples. The following examples are provided to illustrate the present disclosure, but cannot be construed as restrictive.

In the present disclosure, unless otherwise specified, "plural" means two or more; the terms "up", "down", "left", "right", "inside", "outside", "front end", "back end", "head" and "tail" indicate the orientation or position relative to those shown in the accompany drawings. They are only for the purpose of facilitating the description of the present disclosure and simplifying the description, and does not indicate or imply that the devices or elements referred to must a specific orientation or be constructed and operated in a specific orientation. In addition, the terms "first," "second" and "third" are only used for descriptive purposes and cannot be understood as indicating or implying relative importance.

In the description of the present disclosure, it should be noted that unless otherwise specified and defined, the terms "connected" and "in connection with" should be broadly understood. For example, they can refer to fixed connections, detachable connections or integrated connections; They can be mechanical connections or electrical connections; they can be directly connections or indirectly connections through an intermediary. For those skilled in art, the specific meanings of the above terms in the present disclosure can be understood in context.

1. The method for determining a magnetic field parameter threshold of negative-pressure arc welding provided by the present disclosure will be described in conjunction with FIGS. 1-7. First, a mathematical model of the negative-pressure arc is established to calculate the negative-pressure threshold under different conditions. The calculated negative-pressure threshold data are then fitted to obtain an equation for determining the magnetic field parameter threshold of negative-pressure arc welding.

Figure 1:
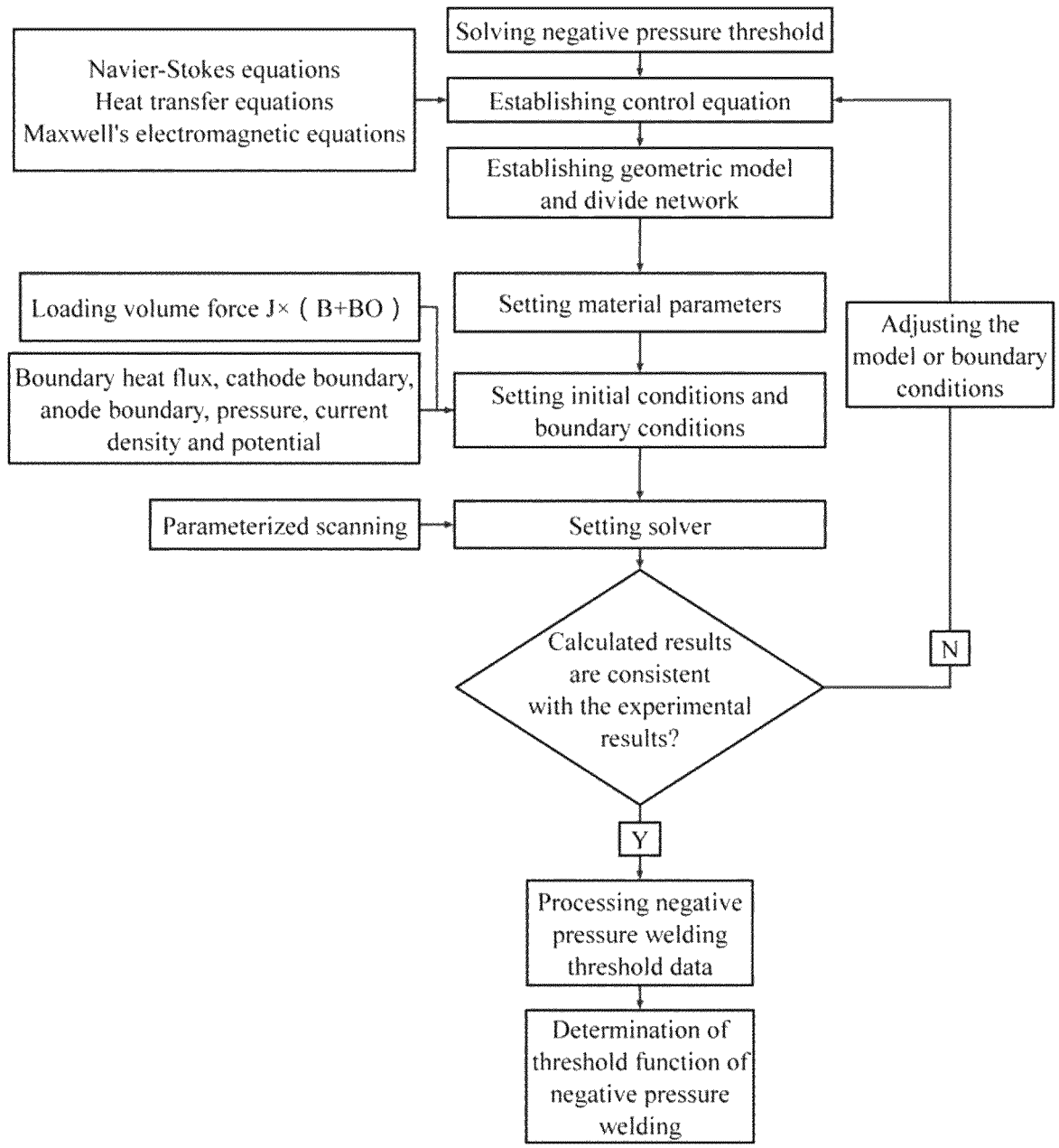
FIG. 1 is a flow diagram of the present disclosure.

As shown in FIG. 1, the flow diagram of the present disclosure presents the following steps:

step 1, establishing a control equation, which consists of the Navier-Stokes equation, heat transfer equation, and Maxwell's electromagnetic equation, specifically comprising Determining the velocity and pressure distribution of arc plasma based on mass conservation and momentum conservation equations $$\frac{\partial \rho}{\partial t} + \nabla \cdot (\rho v) = 0 \tag{1}$$

$$\rho \frac{\partial v}{\partial t} + \rho(v \cdot \nabla)v = \nabla \cdot \left[-pI + \mu(\nabla v + (\nabla v)^T) - \frac{2}{3}\mu(\nabla \cdot v)I\right] + F \tag{2}$$

where ρ is the density; V is the velocity vector; P is the pressure; μ is the viscosity; I is the identity matrix; F is the momentum source term;

solving arc temperature T according to the energy conservation equation $$\rho C_p \left(\frac{\partial T}{\partial t} + v \cdot \nabla T\right) = \nabla \cdot (k \nabla T) + Q \tag{3}$$

where k is the coefficient of heat conduction; T is the temperature; Cp is the specific heat capacity; Q is the source term of the energy conservation equation;

calculating potential and magnetic vector potential distribution according to current continuity equation and Ohm's law:

$$\nabla \cdot (\sigma \nabla V + \sigma \frac{\partial A}{\partial t}) = 0 \tag{4}$$

$$\nabla \times (\frac{1}{\mu_0} \nabla \times A) + \sigma \nabla V = 0 \tag{5}$$

where V is the potential, A is the magnetic vector potential, and σ is the conductivity;
solving the current density J and magnetic flux density B of the electric field E based on V and A according to:

$$J = -\sigma(\nabla V + \frac{\partial A}{\partial t}) \tag{6}$$

$$E = -(\nabla V + \frac{\partial A}{\partial t}) \tag{7}$$

$$B = \nabla \times A \tag{8}$$

where J is the current density, E is the electric field and B is the magnetic flux density;
solving the arc energy source term consisting of Joule heat, electron enthalpy transfer and arc radiation loss according to:

$$Q = J \cdot E + \frac{\partial}{\partial T}\left(\frac{5k_bT}{2q}\right)(\nabla T \cdot J) - Q_{rad} \tag{9}$$

where $K_B$ is Boltzmann constant; e is the electron charge; T is the temperature field of arc shape; Q is the heat source term; Qrad is arc radiation loss;
according to the arc self-induced magnetic flux density B, current density J and momentum conservation equation, solving the momentum source term in the momentum conservation equation according to:

$$F = J \times B \tag{10}$$

step 2, establishing geometric models and mesh division: establishing geometric models of hollow tungsten electrode arc and solid tungsten electrode arc, and then selectively meshing the models;
step 3, setting material parameters: selectively setting material parameters for each part of the geometric model;
step 4, setting initial conditions and boundary conditions comprising boundary heat flux, cathode boundary, anode boundary, pressure, current density and potential, and loading volume force J*(B+B₀); where
the boundary conditions are as follows:
(1) solid current density input:

$$J = \frac{I}{\pi R_w^2} \tag{11}$$

(2) current density of hollow tungsten electrode:

$$J = \frac{I}{R_w^2 - R_i^2} \tag{12}$$

(3) shielding gas flow rate:

$$v_{in}(r) = \frac{2Q}{\pi} \frac{R_n^2 - r^2 + (R_n^2 - R_w^2)\left(\ln\left(\frac{r}{R_n}\right)/\ln\left(\frac{R_n}{R_w}\right)\right)}{R_n^4 - R_w^4 + \left((R_n^2 - R_w^2)^2/\ln\left(\frac{R_n}{R_w}\right)\right)} \tag{13}$$

I is the welding current, Q is the shielding gas flow, $R_n$ is the shielding gas inlet radius, $R_w$ is the tungsten electrode radius, $R_i$ is the inner diameter of hollow cavity, and r is the distance from shielding gas inlet to center;
(4) the cathode boundary given by $$-n \cdot (-k\nabla T) = |J_i|V_i - |J_e|\phi_e - \alpha\varepsilon T^4 \tag{14}$$

$$J_e = J_r[(|J \cdot n| - J_r) > 0] + |J \cdot n|[(|J \cdot n| - J_r) < 0] \tag{15}$$

$$J_i = |J \cdot n| - J_e \tag{16}$$

$$J_r = A_r T^2 \exp\left(\frac{-\phi_e}{k_bT}\right) \tag{17}$$

(5) the anode boundary given by:

$$-n \cdot (-k\nabla T) = |J \cdot n|\phi_a - \alpha\varepsilon T^4 \tag{18}$$

where $|J_i|V_i$ is the cathode ion heat, $|J_e|\varphi_c$ is the electron heat that plays a cooling role; and $\varphi_a$, $\varphi_c$ is the surface work function; $V_i$ is the ionization potential of argon; $A_r$ is the Richardson constant, $\varphi_e$ is the effective work function of cathode, e is the elementary charge and $k_b$ is the Boltzmann constant.
(6) adding the external electromagnetic force by changing the momentum source term:

$$F = J \times (B + B_0) \tag{19}$$

where $B_0$ is the magnetic flux density of the external longitudinal magnetic field;
step 5, performing parameterized scanning, and setting a solver: calculating and solving according to the above steps, and verifying whether the calculated results are consistent with the experimental results under the same conditions, and when the results are consistent, proceeding to the next step; otherwise, going back to step 2, adjusting the model or boundary conditions, and repeating the cycle process of modeling and numerical simulation calculation until the calculation results are consistent with the experimental results under the same conditions to complete the model accuracy verification;
step 6: fixing the model and solving method, parameterizing the batch calculation to obtain the parameter threshold of negative-pressure welding under other conditions, processing the threshold data of negative-pressure welding, and determining the threshold function of negative-pressure welding: fitting multiple groups of threshold data of negative-pressure welding under different conditions to obtain the functional equation of the threshold of longitudinal magnetic field parameters of negative-pressure arc welding.

In step 2, the suction pressure is applied to the hollow tungsten electrode arc to study the physical characteristics of the suction pressure on the hollow tungsten electrode arc.

The mesh element in the meshing in step 2 is a tetrahedron or a hexahedron.

The shielding gas in step 4 is 99.99% argon, helium, or a mixed inert gas. The external magnetic field mode is the longitudinal magnetic field mode, and the magnetic field mode is a uniform alternating magnetic field mode, intermittent alternating magnetic field mode, or pulsed alternating magnetic field mode.

For a welding current of 80-200 A, arc length of 3 mm, 100% pure argon protection, and solid tungsten electrode conditions, the welding current-magnetic field strength as a function of the welding threshold constructed to be a negative-pressure GTAW weld is given by $$B(I) = 0.0225 + 2.56e - 5 * \exp(I/29.9).$$

It is suitable for negative-pressure arc welding, negative-pressure arc additive manufacturing, negative-pressure arc-laser composite welding, negative-pressure arc-laser composite cladding, negative-pressure arc-laser composite additive manufacturing, negative-pressure arc-high-energy beam composite welding, negative-pressure arc-high-energy beam composite cladding, and negative-pressure arc-high-energy beam composite additive manufacturing technologies.

Example 1

Figure 2A:
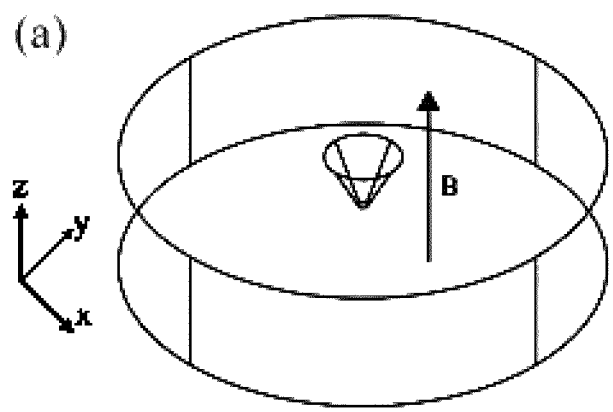
FIG. 2(a) shows a three-dimensional geometry model of solid tungsten arc welding.
Figure 2B:
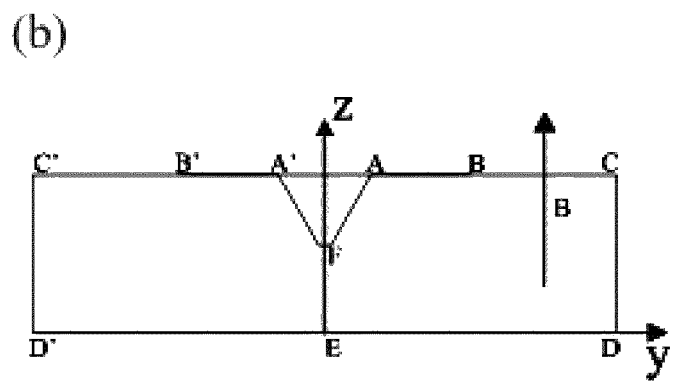
FIG. 2(b) shows a two-dimensional front view of the geometry model of solid tungsten arc welding.

In the method for determining the magnetic field parameter threshold in the negative-pressure arc welding of a solid tungsten electrode in this example, the radius of the solid tungsten electrode was 1.6 mm; the included angle of the tungsten electrode tip was 60° C., the radius of the protective gas inlet was 5 mm, the workpiece radius was 10 mm, the arc length was 3 mm, the input current was 80A; the external longitudinal magnetic flux density ranged from 0 to 0.04 T; the flow rate of the shielding gas was 20 L/min, the shielding gas was 99.99% argon, and the flow rate of the shielding gas was 15-25l/min;

As shown in FIGS. 2(a)-2(b), according to the geometric model of the solid tungsten electrode geometry model diagrams of the present disclosure, the boundary conditions and initial conditions in Table 1 were set in the numerical simulation, and the mathematical model of the solid tungsten electrode negative-pressure arc was established:

TABLE 1

Arc boundary conditions for GTAW welding with solid tungsten electrode

| Boundary | Velocity v | Temperature T | Potential Φ | Magnetic vector potential A |
|---|---|---|---|---|
| AA' | — | 1000 | formula (11) | $\partial A/\partial n = 0$ |
| AB | formula (13) | 500 | $\partial \Phi/\partial n = 0$ | $\partial A/\partial n = 0$ |

TABLE 1-continued

Arc boundary conditions for GTAW welding with solid tungsten electrode

| Boundary | Velocity v | Temperature T | Potential Φ | Magnetic vector potential A |
|---|---|---|---|---|
| BC | — | −q = 0 | $\partial \Phi/\partial n = 0$ | $\partial A/\partial n = 0$ |
| CD | — | −q = 0 | $\partial \Phi/\partial n = 0$ | $\partial A/\partial n = 0$ |
| DE | — | formula (18) | 0 V | $\partial A/\partial n = 0$ |
| AF | — | formula (14) | $\partial \Phi/\partial n = 0$ | $\partial A/\partial n = 0$ |

When the input current was 80 A, it was divided into external longitudinal magnetic fields with magnetic flux densities of 0, 0.01, 0.02, 0.03 and 0.04 T, and these five groups of data were numerically simulated and calculated. According to the calculation results, it can be seen that the arc pressure of conventional GTAW arc was mainly concentrated in tungsten electrode and workpiece, and the peak pressure appeared at the tungsten electrode, and a small range of negative-pressure appears on both sides of the tungsten electrode. When the external magnetic flux density increased, the overall pressure of the arc decreased. When the magnetic flux density reached 0.02 T, the rotating arc plasma created a concentrated negative-pressure area under the tungsten electrode under the action of centrifugal force. When the magnetic flux density continued to increase, the concentrated negative-pressure area under the tungsten electrode continued to expand, and the pressure continued to decrease. When the negative-pressure area expanded to the workpiece, a negative-pressure appeared at the center of the workpiece.

Figure 4:
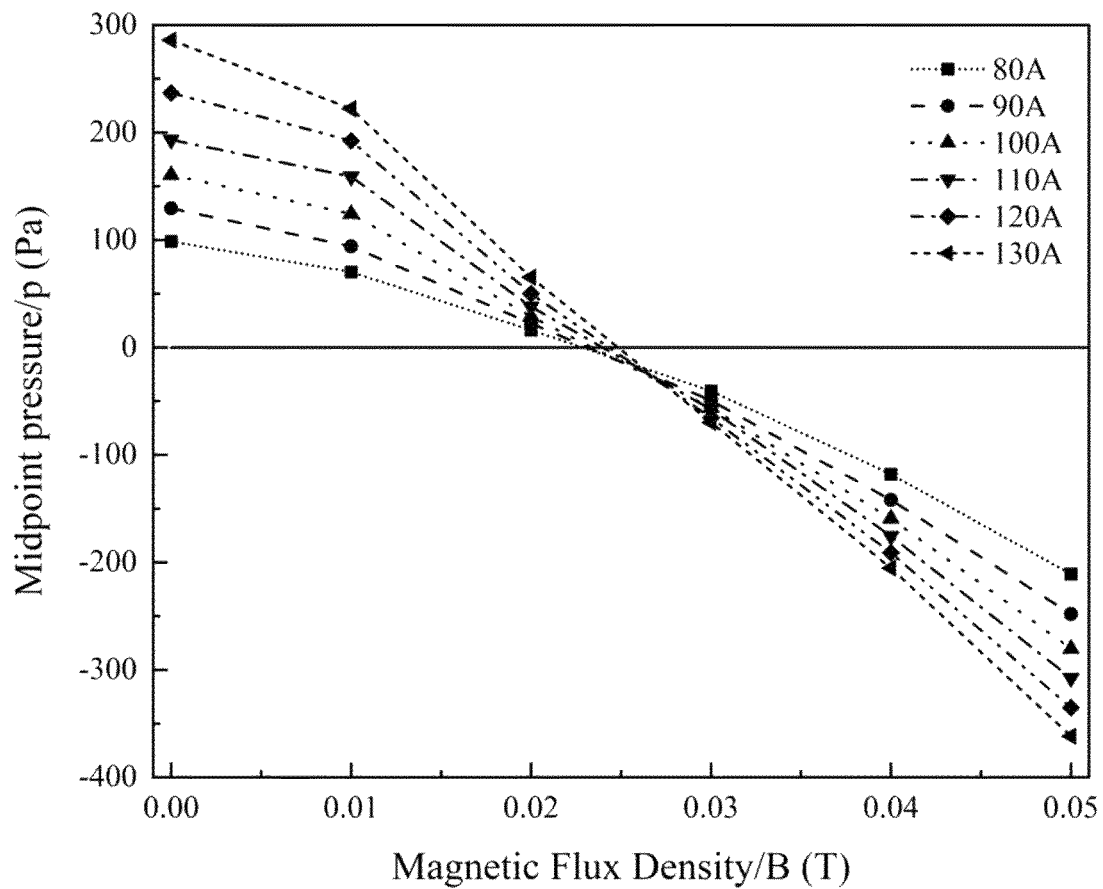
FIG. 4 is a diagram showing the center pressure of the 0 to 0.04 T workpiece with different currents in a solid tungsten electrode arc according to the present disclosure.

In addition to the input current of 80 A, the numerical simulation calculation above was repeated for 90 A, 100 A, 110 A and 130 A. According to the calculation results, the 0 ~ 0.04 T workpiece center pressure diagram with different current sizes during the solid tungsten electrode arc, as shown in FIG. 4, was fitted. It can be seen that when the magnetic flux density increases from 0.02 T to 0.03 T, the center pressure changed from positive pressure to negative-pressure. In addition, the change rate of the center pressure increased with an increase in the welding current, resulting in a steeper slope. Under a magnetic flux density of 0.01 T, the central pressure difference between 80 A and 120 A was 133.6 Pa. At a magnetic flux density of 0.02 T, the difference between the center pressures of 80 k and 120 A was 72.3 Pa. When the magnetic flux density was less than 0.03 T, the influence of the welding current on the center pressure decreased with an increase in the magnetic flux density. In this range, the magnetic field plays a leading role in the current-pressure-magnetic relationship. Under a magnetic flux density of 0.03 T, the central pressure difference between 80 A and 120 A was 10.5 Pa. At a magnetic flux density of 0.04 T, the difference between the center pressures of 80 k and 120 A was 72.3 Pa. When the magnetic flux density exceeded 0.03 T, the influence of the welding current on the center pressure increased with an increase in the magnetic flux density. In this range, the magnetic field and welding current play a leading role in the current-pressure-magnetic relationship.

Figure 5:
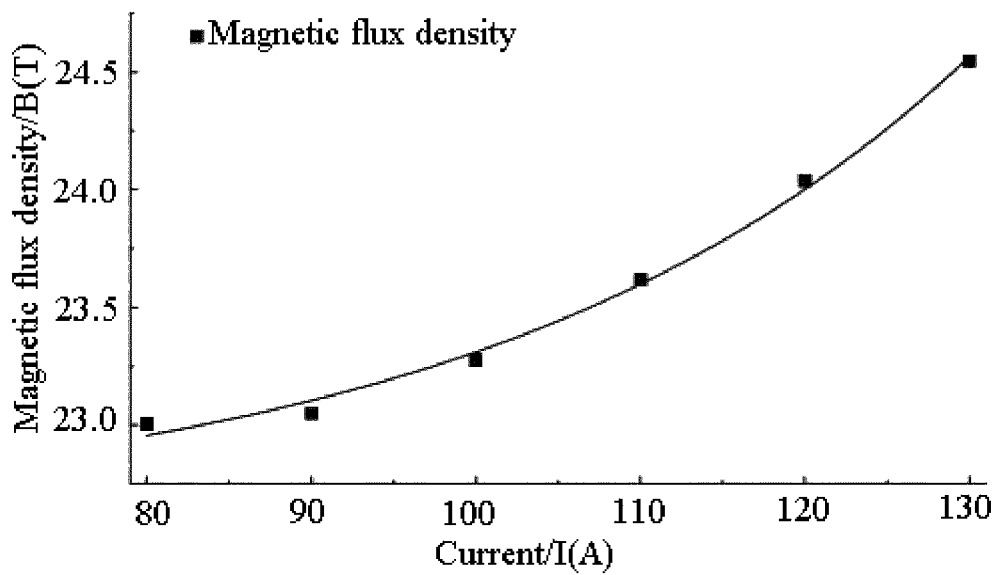
FIG. 5 is a diagram showing the magnetic field parameter threshold for the transition of the 0 to 0.04 T workpiece center pressure at different currents in a solid tungsten electrode arc according to the present disclosure.
Figure 6:
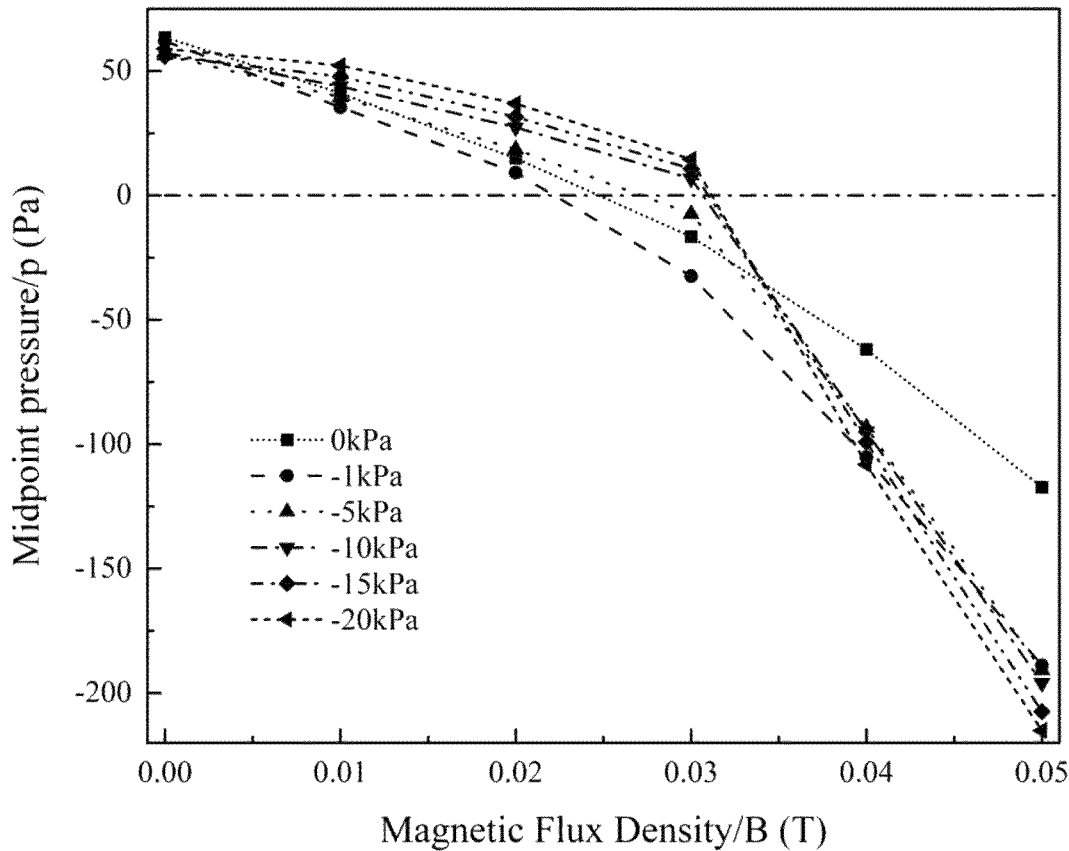
FIG. 6 is a diagram showing the 0-0.05 T workpiece center pressure under different suction pressures in a hollow tungsten electrode arc according to the present disclosure.

The welding current from 80-120 A to the workpiece center pressure and the magnetic flux density were linearly fitted, and a magnetic field parameter threshold diagram showing the workpiece center pressure transition with different currents in a solid tungsten electrode arc, as shown in FIG. 5, was obtained, and the equation was:

$$B(I) = 0.0225 + 2.56e - 5 * \exp(I/29.9) \quad (20)$$

Example 2

In this example, the method for determining the magnetic field parameter threshold in hollow tungsten negative-pressure arc welding and the geometric model of the hollow tungsten electrode arc are described. The radius of the hollow tungsten electrode center negative-pressure arc was 1.6 mm, the radius of the hollow cavity was 0.5 mm, and the arc length was 3 mm. The welding current was 80A, the magnetic flux density was 0-0.05 t, the magnetic field direction was +z, and the suction pressure ranged from 0 kPa to −20 kPa. The pressures in this disclosure are all relative pressures (−20 kPa is atmospheric pressure minus 20 kpa); the protective gas was 99.99% argon, and the flow rate of the protective gas was 20-30 L/min.

Figure 3A:
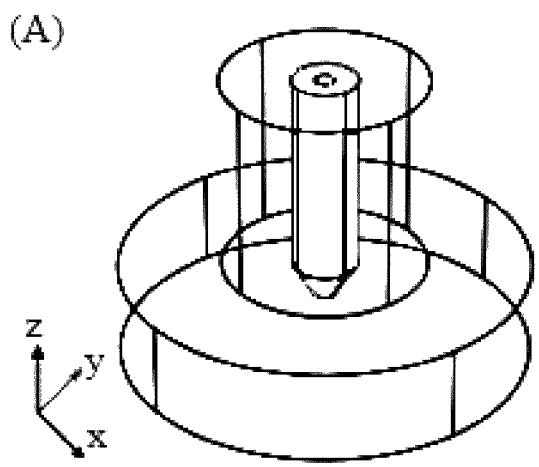
FIG. 3(A) shows a three-dimensional geometry model of hollow tungsten arc welding.
Figure 3B:
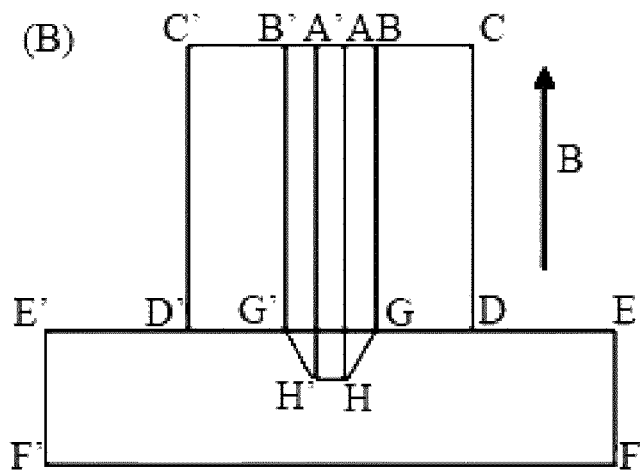
FIG. 3(B) shows a two-dimensional front view of the geometry model of the hollow tungsten arc welding.

As shown in FIGS. 3(A)-3(B), according to the epipolar geometry model diagrams of hollow tungsten, the boundary conditions and initial conditions in Table 2 were set in the numerical simulation, and the mathematical model of the hollow tungsten negative-pressure arc was established:

TABLE 2

Arc boundary conditions of GTAW welding with hollow tungsten electrode

| Boundary | Velocity v | Pressure p | Temperature T | Potential Φ | Magnetic vector potential A |
|---|---|---|---|---|---|
| AA' | — | p_out | −q = 0 | ∂Φ/∂n = 0 | ∂A/∂n = 0 |
| AB | — | — | 300 K | formula (12) | ∂A/∂n = 0 |
| BC | formula (13) | — | −q = 0 | ∂Φ/∂n = 0 | ∂A/∂n = 0 |
| CD | — | — | −q = 0 | ∂Φ/∂n = 0 | ∂A/∂n = 0 |
| DE | — | — | −q = 0 | ∂Φ/∂n = 0 | ∂A/∂n = 0 |
| EF | — | — | −q = 0 | ∂Φ/∂n = 0 | ∂A/∂n = 0 |
| FF' | — | — | formula (18) | 0 V | ∂A/∂n = 0 |
| AHGB | — | — | formula (14) | ∂Φ/∂n = 0 | ∂A/∂n = 0 |

When the suction pressure was 0 kPa, it was divided into external longitudinal magnetic fields with magnetic flux densities of 0, 0.01, 0.02, 0.03, 0.04 and 0.05 T, and these five groups of data were numerically simulated. According to the calculation results, it could be known that the arc pressure field without external magnetic field was bell-shaped. The arc pressure was mainly concentrated at the tungsten electrode and workpiece. The peak arc pressure appeared at the tungsten electrode. With an increase in the magnetic flux density, the rotating speed of the arc plasma near the tungsten electrode increased continuously, which caused the pressure in the arc center to decrease continuously. The peak arc pressure at 0.01 T appeared at the workpiece. At 0.02 T, the negative-pressure concentration area appeared in the arc center. With increasing magnetic flux density, the negative-pressure area expanded and formed a negative-pressure on the surface of the workpiece.

The above numerical simulation calculation was repeated for pumping pressures of −1 kPa, −5 kPa, −10 kPa, −15 kPa and −20 kPa except for the pumping pressure of 0 kPa. According to the calculation results, the 0-0.05 t workpiece center pressure diagram with different pumping pressures in the hollow tungsten electrode arc welding shown in FIG. 6 was fitted. It can be seen that the arc pressure change was divided into two parts. When the magnetic flux density was less than 0.03 T, the central pressure of the workpiece first dropped and then rose under the action of the pumping pressure. When the magnetic flux density was greater than 0.03 T, the overall central pressure of the workpiece showed a downward trend. It can be seen that no matter how the pumping pressure changes, the center pressure of the workpiece always decreases with the decrease of the external longitudinal magnetic field intensity. When the pumping pressure was lower than −5 kPa, the magnetic flux density required for negative-pressure on the workpiece surface increased. When the magnetic flux density was 0.05 T, the pumping pressure promoted the reduction of arc pressure.

Figure 7:
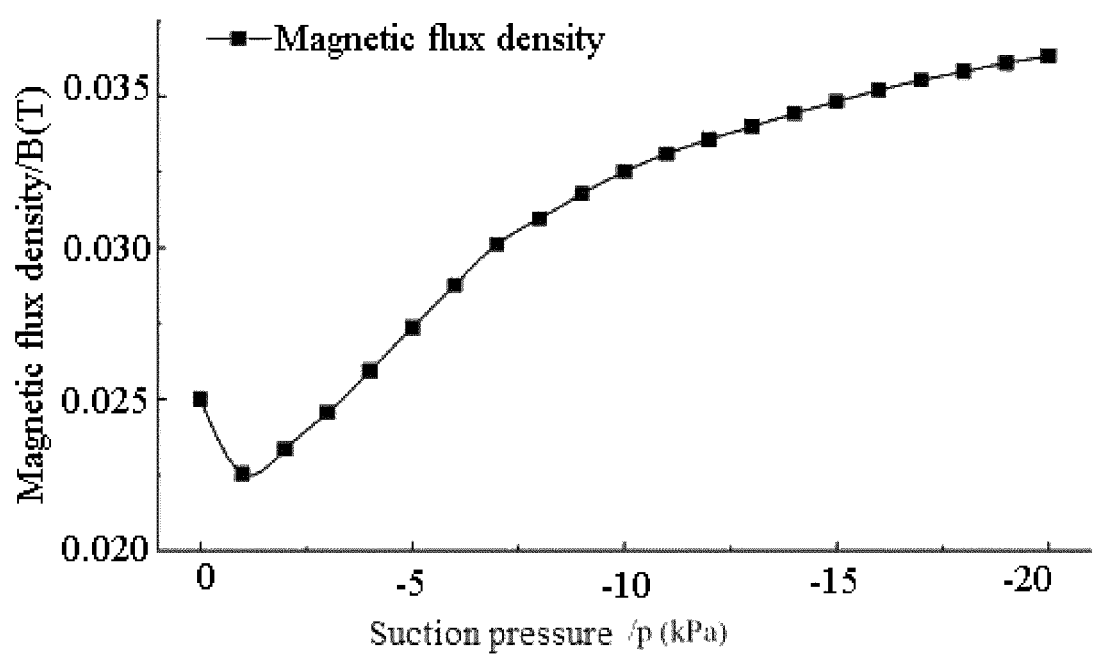
FIG. 7 is a diagram showing the magnetic field parameter threshold for the transition of the 0 to 0.05 T workpiece center pressure under different suction pressures in a hollow tungsten electrode arc according to the present disclosure.

Linear fitting was performed between the center pressure of the workpiece with pumping pressures from 0 to −20 kPa and the magnetic flux density, and the magnetic field parameter threshold diagram of the center pressure transition of the workpiece with different pumping pressures during the hollow tungsten electrode arc, as shown in FIG. 7, was obtained.

Finally, the above embodiments are to be considered in all respects only as illustrative and not restrictive. Although the present disclosure has been described in detail with reference to the preferred embodiments, those skilled in art should understand that modifications or equivalent substitutions can be made to the embodiments of the present disclosure without departing from the purpose and scope of the present disclosure, and such modifications or equivalent substitutions should be included in the scope of the claims of the present disclosure.

The invention claimed is:

1. A method for determining a magnetic field parameter threshold of negative-pressure arc welding, comprising firstly, establishing a mathematical model of a negative-pressure arc, calculating the negative-pressure threshold under different conditions, and then fitting the calculated negative-pressure threshold to obtain an equation for determining the magnetic field parameter threshold of negative-pressure arc welding;

specifically comprise the following step:

step 1, establishing a control equation, which consists of a Navier-Stokes equation, a heat transfer equation, and a Maxwell's electromagnetic equation, specifically comprising;

determining velocity and pressure distribution of arc plasma based on mass conservation equation and momentum conservation equation;

$$\frac{\partial \rho}{\partial t} + \nabla \cdot (\rho v) = 0 \quad (1)$$

$$\rho \frac{\partial v}{\partial t} + \rho(v \cdot \nabla)v = \nabla \cdot [-pI + \mu(\nabla v + (\nabla v)^T) - \frac{2}{3}\mu(\nabla \cdot v)I] + F \quad (2)$$

wherein ρ is density, V is velocity vector, P is pressure, μ is viscosity, I is identity matrix, and F is momentum source;

solving arc temperature T according to energy conservation equation;

$$\rho C_p(\frac{\partial T}{\partial t} + \upsilon \cdot \nabla T) = \nabla \cdot (k\nabla T) + Q \quad (3)$$

wherein k is coefficient of heat conduction, T is temperature, Cp is specific heat capacity, and Q is a source term of the energy conservation equation;

calculating potential and magnetic vector potential distribution according to current continuity equation and Ohm's law;

$$\nabla \cdot (\sigma \nabla V + \sigma \frac{\partial A}{\partial t}) = 0 \quad (4)$$

$$\nabla \times (\frac{1}{\mu_0} \nabla \times A) + \sigma \nabla V = 0 \quad (5)$$

wherein V is potential, A is magnetic vector potential, and σ is conductivity;

solving current density J and magnetic flux density B of electric field E based on V and A according to equations:

$$J = -\sigma(\nabla V + \frac{\partial A}{\partial t}) \quad (6)$$

$$E = -(\nabla V + \frac{\partial A}{\partial t}) \quad (7)$$

$$B = \nabla \times A \quad (8)$$

wherein J is current density, E is electric field and B is magnetic flux density;

solving the arc energy source term consisting of Joule heat, electron enthalpy transfer, and arc radiation loss according to:

$$Q = J \cdot E + \frac{\partial}{\partial T}\left(\frac{5k_b T}{2q}\right)(\nabla T \cdot J) - Q_{rad} \quad (9)$$

wherein $K_B$ is Boltzmann constant; e is electron charge; T is temperature field of arc shape; Q is heat source term; $Q_{rad}$ is arc radiation loss;

solving a momentum source term in the momentum conservation equation based on the arc self-induced magnetic flux density B, the current density J, and the momentum conservation equation according to:

$$F = J \times B \quad (10)$$

step 2, establishing geometric models and meshing: establishing geometric models of a hollow tungsten electrode arc and a solid tungsten electrode arc and then selectively meshing the models;

step 3, setting material parameters: selectively setting material parameters for each part of the geometric models;

step 4, setting initial conditions and boundary conditions comprising boundary heat flux, cathode boundary, anode boundary, pressure, current density and potential, and loading volume force J*(B+B₀);

the boundary conditions comprise:

(1) solid current density input given by:

$$J = \frac{I}{\pi R_w^2} \quad (11)$$

(2) current density of hollow tungsten electrode given by:

$$J = \frac{I}{R_w^2 - R_i^2} \quad (12)$$

(3) shielding gas flow rate given by:

$$v_{in}(r) = \frac{2Q^{R_n^2 - r^2 + (R_n^2 - R_w^2)\left(\ln\left(\frac{r}{R_n}\right)/\ln\left(\frac{R_n}{R_w}\right)\right)}}{\pi R_n^4 - R_w^4 + \left((R_n^2 - R_w^2)^2/\ln\left(\frac{R_n}{R_w}\right)\right)} \quad (13)$$

I is the welding current, Q is the shielding gas flow, $R_n$ is the shielding gas inlet radius, $R_w$ is the tungsten electrode radius, $R_i$ is the inner diameter of hollow cavity, and r is the distance from shielding gas inlet to center;

(4) the cathode boundary given by:

$$-n \cdot (-k\nabla T) = |J_i|V_i - |J_e|\phi_e - \alpha \varepsilon T^4 \quad (14)$$

$$J_e = J_r[(|J \cdot n| - J_r) > 0] + |J \cdot n|[(|J \cdot n| - J_r) < 0] \quad (15)$$

$$J_i = |J \cdot n| - J_e \quad (16)$$

$$J_r = A_r T^2 \exp\left(\frac{-\phi_e}{k_b T}\right) \quad (17)$$

(5) the anode boundary given by:

$$-n \cdot (-k\nabla T) = |J \cdot n|\phi_a - \alpha \varepsilon T^4 \quad (18)$$

wherein $|J_i|V_i$ is cathode ion heat, $|J_e|\phi_c$ is electron heat that plays a cooling role; and $\phi_a$, $\phi_c$ is surface work function; $V_i$ is ionization potential of argon; $A_r$ is Richardson constant, $\phi_e$ is effective work function of cathode, e is elementary charge and $k_b$ is Boltzmann constant; and wherein (6) an external electromagnetic force is added by changing the momentum source term:

$$F = J \times (B + B_0) \quad (19)$$

wherein $B_0$ is magnetic flux density of an external longitudinal magnetic field;

step 5, performing parameterized scanning, and setting a solver: performing calculation and solving according to the above steps and verifying whether the calculated results are consistent with experimental results under same conditions; when the calculated results are consistent with the experimental results, proceeding to the next step; otherwise, returning to step 2, adjusting the model or the boundary conditions, and repeating a cycle process of modeling and numerical simulation calculation until the calculated results are consistent with the experimental results under the same conditions so that a model accuracy verification is achieved;

step 6, fixing the model, parameterizing a batch calculation to obtain the parameter threshold of negative-pressure welding under other conditions, processing the parameter threshold of negative-pressure welding, and determining a threshold function of negative-pressure welding: fitting multiple groups of threshold data of negative-pressure welding under different conditions to obtain a functional equation of a threshold of longitudinal magnetic field parameters of negative-pressure arc welding, to predict an occurrence of negative-pressure, wherein for welding current of 80-200 A, arc length of 3 mm, 100% pure argon protection and solid tungsten electrode conditions, a welding current-magnetic field strength as a function of welding threshold constructed to be a negative-pressure GTAW weld is given by $B(I)=0.0225+2.56e-5* \exp(1/29.9)$; and step 7, determining, based on the function of welding threshold, a target welding current and a target welding magnetic field strength, and controlling, based on the target welding current and the target welding magnetic field strength, an electric welder or an arc welding system to perform a negative-pressure arc welding operation.

2. The method for determining a magnetic field parameter threshold of negative-pressure arc welding according to claim 1, wherein in step 2, suction pressure is applied to the hollow tungsten electrode arc to study physical characteristics of the suction pressure on the hollow tungsten electrode arc.

3. The method for determining a magnetic field parameter threshold of negative-pressure arc welding according to claim 1, wherein mesh element of the meshing in step 2 is a tetrahedron or a hexahedron.

4. The method for determining a magnetic field parameter threshold of negative-pressure arc welding according to claim 1, wherein a shielding gas in step 4 is selected from the group consisting of 99.99% argon, helium an mixed inert gas, a external magnetic field mode is longitudinal magnetic field mode, and a magnetic field mode is selected from the group consisting of a uniform alternating magnetic field mode, an intermittent alternating magnetic field mode, and a pulse alternating magnetic field mode.

5. The method for determining a magnetic field parameter threshold of negative-pressure arc welding according to claim 1, wherein the method is for negative-pressure arc welding technology, negative-pressure arc additive manufacturing technology, negative-pressure arc-laser composite welding technology, negative-pressure arc-laser composite cladding technology, negative-pressure arc-laser composite additive manufacturing technology, negative-pressure arc-high energy beam composite welding technology, negative-pressure arc-high energy beam composite cladding technology or negative-pressure arc-high energy beam composite additive manufacturing technology.

* * * * *